United States Patent [19]
Marchesini et al.

[11] Patent Number: 5,928,559
[45] Date of Patent: Jul. 27, 1999

[54] PROCESS FOR THE MANUFACTURE OF HYPOCHLORITE BLEACHING COMPOSITIONS

[75] Inventors: Mauririo Marchesini, Rome; Giuseppe Trigiante, Pisa, both of Italy

[73] Assignee: The Procter & Gamble Company, Cincinnati, Ohio

[21] Appl. No.: 08/952,231

[22] PCT Filed: Apr. 19, 1996

[86] PCT No.: PCT/US96/05603

§ 371 Date: Nov. 17, 1997

§ 102(e) Date: Nov. 17, 1997

[87] PCT Pub. No.: WO96/36560

PCT Pub. Date: Nov. 21, 1996

[30] Foreign Application Priority Data

May 16, 1995 [EP] European Pat. Off. .............. 95870055

[51] Int. Cl.$^6$ .................................................. C01B 11/06
[52] U.S. Cl. ................................ 252/187.25; 252/187.24; 252/187.26; 423/473; 423/34; 423/50; 423/55; 423/140
[58] Field of Search ........................ 252/187.24, 187.25, 252/187.26; 423/473, 474, 34, 50, 55, 140

[56] References Cited

U.S. PATENT DOCUMENTS

| | | | |
|---|---|---|---|
| 4,049,545 | 9/1977 | Horvath | 210/28 |
| 4,405,418 | 9/1983 | Takemura | 204/95 |
| 4,526,700 | 7/1985 | Hensley et al. | 252/187.26 |
| 4,529,534 | 7/1985 | Richardon | 252/186.26 |
| 4,539,144 | 9/1985 | de Ridder et al. | 510/230 |
| 4,623,726 | 11/1986 | Daniels | 546/168 |
| 4,898,681 | 2/1990 | Burton | 252/186.37 |
| 5,464,563 | 11/1995 | Moore et al. | 252/186.29 |

*Primary Examiner*—Joseph D. Anthony
*Attorney, Agent, or Firm*—Richard S. Echler; Kim William Zerby; Jacobus C. Rasser

[57] ABSTRACT

The present invention discloses a process for the manufacture of liquid aqueous bleaching compositions comprising alkali metal hypochlorite, a strong source of alkalinity and water; said process comprising the steps of: mixing alkali metal hypochlorite, strong source of alkalinity and said water, separating the insoluble species formed in the first step, and thereafter adding a chelating agent capable of chelating heavy metal ions. The compositions provided by the process according to the present invention are substantially free of heavy metal ions, thereby providing improved whiteness performance and/or fabric safety performance.

16 Claims, No Drawings

PROCESS FOR THE MANUFACTURE OF HYPOCHLORITE BLEACHING COMPOSITIONS

This application is a 371 of PCT/US96/05603 filed April 19, 1996.

TECHNICAL FIELD

The present invention relates to a process for the manufacture of a liquid bleaching composition which is suitable for laundry applications including handwashing as well as washing with automatic washing machines.

BACKGROUND OF THE INVENTION

Liquid bleaching compositions are well known in the art. Amongst the different bleaching compositions available, those relying on bleaching by hypochlorite are often preferred. Representative of the art is, for example, WO-88-05461 which discloses an aqueous composition comprising hypochlorite, sodium carbonate and sodium hydroxide and the use of said composition for removing stains from the fabrics.

However, the drawbacks associated with the use of chlorine-based compositions are that said compositions may both damage and yellow fabrics.

We have now found that the whiteness performance and/or the fabric safety performance of a liquid aqueous hypochlorite-containing composition is mainly dependent on two factors: the pH of the bleaching environment and the presence of heavy metal ions in said bleaching environment.

It is believed that higher pH of the bleaching environment is beneficial for the whiteness and fabric safety performance because it shifts the chemical equilibrium between hypochlorite and hypochlorous acid to reduce the level of hypochlorous acid, the species which we have found to be the most responsible for the yellowing and the fabric damage.

The presence of heavy metal ions such as Ni, Co, Cu, Mn, Cr, and Fe adversely affects the hypochlorite bleaching performance. It is believed that in the washing environment said heavy metal ions catalyze the attack of hypochlorous acid on fabrics with the generation of yellow oxidized species. Said heavy metal ions also lead to reduced tensile strength of the fabrics, thereby reducing fabric resistance. It is further believed that said heavy metal ions are adsorbed per se on oxidized fabrics as colored species and catalyze the degradation of the brighteners adsorbed on fabrics generating thereby highly colored species on fabrics. Also, said heavy metal ions stabilize colored pigments of enzymatic stains such as blood or grass. Furthermore, it is believed that said heavy metal ions are detrimental for the performance of a hypochlorite composition as they tend to react with the hypochlorite present in said composition and thereby catalyze the decomposition of said hypochlorite.

In the current industrial manufacturing processes, liquid aqueous compositions comprising hypochlorite and a source of alkalinity, such as sodium hydroxide, are prepared by using the cheapest and most commonly available raw materials. Such commercially available raw materials are usually contaminated by impurities like heavy metal ions. For example, the commercially available hypochlorite used may contain proportions of other materials such as sodium carbonate and/or caustic soda and/or heavy metal ions. Also, the current caustic soda is commonly contaminated by heavy metal ions such as iron.

More particularly, in the current industrial manufacturing processes, such liquid aqueous compositions comprising hypochlorite are prepared by diluting a concentrated hypochlorite solution with tap water, i.e. non-demineralized water, in presence of said source of alkalinity, allowing precipitation of insoluble salts, such as metal hydroxides and metal carbonates, and finally removing said insoluble salts from said compositions. However, the compositions obtained are not satisfactory as regard their purity, because they still contain a certain level of heavy metal ions which have not been retained/eliminated by conventional separation means like filtration with a decantation filter. The amount of heavy metal ions in the finished composition is even higher when manufacturing a liquid aqueous composition comprising hypochlorite at high pH values such as 13 and above. Indeed, the solubility of most of the heavy metal ions that should be eliminated in order to ensure good whiteness and/or fabric safety performance, increases with the pH of the composition.

We have now found that it is essential that the levels of heavy metal ions are controlled in the liquid aqueous hypochlorite-containing compositions per se, thereby providing improved whiteness performance and/or fabric safety performance when treating fabrics with such compositions.

It is therefore an object of the present invention to provide a process for the manufacture of liquid aqueous compositions comprising hypochlorite and a strong source of alkalinity, said compositions having a particular low content of free heavy metal ions, therefore exhibiting improved whiteness and/or fabric safety performance.

It is a further object to provide such a process for the manufacture of liquid aqueous hypochlorite-containing compositions at overall reasonable costs, e.g. to provide compositions exhibiting improved whiteness and/or fabric safety performance by a process wherein the raw materials used are the cheapest and most commonly available commercially.

It has now been found that a particularly efficient control of the heavy metal ions can be achieved by using a manufacturing process where a chelating agent capable of chelating heavy metal ions is added to a liquid aqueous composition comprising a strong source of alkalinity, such as sodium hydroxide, hypochlorite and water after said composition has undergone a separation step where insoluble species present in said composition have been removed/ eliminated from said composition. Indeed, the separation step is intended to remove from said liquid aqueous hypochlorite-containing composition any insoluble specie such as metal hydroxides and/or metal salts present in said composition. Said chelating agent allows to remove the residual heavy metal ions which have not been removed/ eliminated by the separation step, i.e. by any conventional separation means such as filtration with a decantation filter. Adding the chelating agents capable of chelating heavy metal ions after the separation step allows to use less of said chelating agents then would otherwise be required if they were added before said separation step in order to get a composition of the same purity. Indeed, when added before said separation step, said chelating agents interact with metal ions such as magnesium and/or calcium present in the composition which would otherwise be removed as metal salts due to the presence of anions like carbonate commonly found in hypochlorite solutions suitable to be used to manufacture said hypochlorite-containing composition according to the present process, leaving thereby less chelating agents available to chelate the heavy metal ions present in said composition.

The compositions obtainable by the process of the present invention have improved physical and chemical stability. A further advantage of the compositions obtainable by the process of the present invention is that in addition to their outstanding whitening action said compositions allow also good stain removal.

SUMMARY OF THE INVENTION

The present invention encompasses a process for the manufacture of an aqueous liquid bleaching composition having a pH of from 10 to 14 and comprising an alkali metal hypochlorite, a strong source of alkalinity, and water. Said process includes the steps of:

mixing in a first step said alkali metal hypochlorite, said strong source of alkalinity, and said water, separating in a second step the insoluble species formed in said first step, and thereafter adding a chelating agent capable of chelating heavy metal ions.

In a preferred embodiment of the process of the present invention a precipitating agent being capable of binding heavy metal ions thereby forming salts having a solubility product in water not higher than $10^{-6}$ at a temperature of 25° C., is further added to said composition before the separation step.

DETAILED DESCRIPTION OF THE INVENTION

The present invention concerns the manufacture of a liquid aqueous bleaching composition.

The process of the present invention for the manufacture of an aqueous liquid bleaching composition, as described hereinafter, having a pH of from 10 to 14 and comprising an alkali metal hypochlorite, a strong source of alkalinity, and water, comprises the following steps.

In a first step an alkali metal hypochlorite, a strong source of alkalinity, and water are mixed together.

In the next step the insoluble species formed in said first step are separated from said composition.

And thereafter a chelating agent capable of chelating heavy metal ions is added after said separation step.

By "insoluble species formed" it is meant herein any solid phase present in the composition manufactured according to the present invention, i.e. any kind of specie which is insoluble in said composition and thus being capable to be separated from said composition when using any conventional separation means. The insoluble species formed include, for example, metal hydroxides resulting from the precipitation of sodium hydroxide with metal ions, and metal salts resulting from the precipitation of impurities such as sodium carbonate, commonly present in the commercially available hypochlorite solutions suitable to be used in the process of the present invention, with metal ions. The metal ions such as calcium/magnesium as well as heavy metal ions, present in the compositions manufactured according to the process of the present invention result from the raw materials and the tap water used in said process.

By "separating the insoluble species formed" it is meant herein that any means known to remove a solid phase from a liquid phase may be used according to the present invention. Accordingly, the precipitates formed may be removed from the compositions of the present invention by settling and/or filtration and/or centrifugation. Filtration is preferred herein.

Filters suitable to be used in the process according to the present invention are any filters commercially available including decantation filters such as cartridge filter, mesh filter, filter-cakes and the like.

The chelating agents according to the present invention are any chelating agent having a binding constant K to heavy metal ions defined as follows, or mixtures thereof:

when n=1, then K>$10^5$, preferably K>$5.10^5$ and more preferably K>$10^6$, when n=2, then K>$10^6$, preferably K>$5.10^6$ and more preferably K>$10^7$, when n=3, then K>$10^7$, preferably K>$5.10^7$ and more preferably K>$10^8$.

wherein n is the number of chelating agent molecules per heavy metal ion and wherein $K=(MLn)/(M)(L)^n$ and (MLn) is the concentration of heavy metal ion/chelating agent complexes, (M) is the concentration of free heavy metal ions, and (L) is the concentration of free chelating agents.

Examples of chelating agents suitable to be used herein are polycarboxylic acid of pyridine or salts thereof having one of the following formulas:

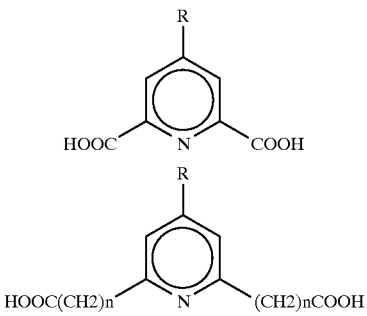

in which R is hydrogen, a halogen atom, a hydroxyl group, an amino group, a carboxylic group or a short-chain alkyl group (C1–C4) and n is 1 or 2. Preferred herein are the polycarboxylic acid derivatives of pyridine selected from the group of dipicolinic acid (2,6-pyridendicarboxylic acid) and derivatives thereof obtained by substitution of the hydrogen in para position with, a halogen, a carboxylic group or a short-chain alkyl group (C1–C4).

Said chelating agents to be used herein are stable to hypochlorite and to high alkalinity. By "stable to hypochlorite and to high alkalinity" it is meant herein that the concentration of said chelating agents does not change after a period of time of two months at room temperature, at about 25° C.

The compositions manufactured according to the process of the present invention comprise from 0.01% to 5% by weight of the total composition of said chelating agent, or mixtures thereof, preferably from 0.01% to 3%, more preferably from 0.01% to 2% and most preferably from 0.01% to 1%.

It has now been found that the addition of a chelating agent capable of chelating heavy metal ions after the separation step, in a process for the manufacture of liquid aqueous hypochlorite-containing compositions reduces the content of heavy metal ions in said compositions. Indeed, the present invention provides liquid aqueous compositions which are substantially free of heavy metal ions, i.e. compositions where the heavy metal ions have been chelated and thus are present in an inactivated form. Indeed, it has now been found that the use of such chelating agents after the separation step, in a process for manufacturing hypochlorite-containing compositions comprising a strong source of alkalinity and water, wherein said different ingredients are mixed before undergoing the separation step, allows to provide hypochlorite-containing compositions with improved whiteness performance and/or fabric safety performance.

By "substantially free of heavy metal ions" it is meant herein that the concentrations of the different heavy metal ions in said compositions manufactured according to the present invention are very low, e.g. the level of Fe is not higher than 1 ppm, the level of Ni is not higher than 20 ppb, the level of Cu is not higher than 20 ppb, the level of Mn is not higher than 10 ppb, and/or the level of Co is not higher than 10 ppb.

Actually, in the process of the present invention said chelating agents are added in excess so as to chelate all the heavy metal ions present in the compositions manufactured according to said process, and to be further available to chelate heavy metal ions present in the washing/bleaching solution.

The compositions manufactured according to the process of the present invention are physically and chemically stable.

By "chemically stable" it is meant herein that the hypochlorite bleach compositions of the present invention should not undergo more than 25% loss of available chlorine after 10 days of storage at 50° C.±0.5° C. The % loss of available chlorine may be measured using the method described, for instance, in "Analyses des Eaux et Extraits de Javel" by 'La chambre syndicate nationale de L'eau de Javel et des produits connexes', Pages 9–10 (1984). Said method consists in measuring the available chlorine in the fresh compositions, i.e. just after they are made, and in the same compositions after 10 days storage at 50° C.

By "physically stable" it is meant herein that no phase alteration occurs upon prolonged periods of storage, such as 10 days at 50° C. By "phase alteration" it is meant herein any change in the physical properties of the solution phases, for example phase separation.

In a preferred embodiment of the process of the present invention a precipitating agent, or mixtures thereof, may be added before the separation step of the process of the present invention. The precipitating agents according to the present invention may be defined as any agent being capable of binding to heavy metal ions, thereby forming non-soluble salts, i.e. salts having a solubility product in water not higher than $10^{-6}$ at a temperature of 25° C., preferably not higher than $10^{-8}$ and more preferably not higher than $10^{-10}$.

It has also been found that the addition of such a precipitating agent or mixtures thereof to a liquid aqueous hypochlorite-containing composition in the process of the present invention before said composition undergoes the separation step, helps the chelating action accomplished by the chelating agents. Indeed, it has been found that the precipitating agents added before the separation step and the chelating agents added after said separation step of the process of the present invention act together so as to provide a hypochlorite-containing composition which is substantially free of heavy metal ions.

When adding the precipitating agents before the separation step in the process of the present invention, more heavy metals ions are precipitated as salts and thus removed by the separation step as compared to the same process without the addition of said precipitating agents. This allowing consequently to use less of said chelating agents after the separation step then would otherwise be required in absence of such precipitating agents before said separation step, this in order to obtain a hypochlorite-containing composition with the same purity.

Also adding said chelating agents after the separation step, as compared to their addition before said separation step, allows to use less of said chelating agents. Indeed, when added before the separation step, said chelating agents interact with magnesium and/or calcium present in the hypochlorite-containing composition, leaving thereby less chelating agents available to chelate the heavy metal ions present in said composition. It is further believed that when added before the separation step, said chelating agents also interact with the precipitating agents if present, leaving thereby less chelating agents available to chelate the heavy metal ions present in said composition as well as less precipitating agents available to precipitate the heavy metal ions as salts.

Examples of precipitating agents suitable to be used herein are alkali metal salts of oxalate, phosphonate, borate, sesquicarbonate, selenure, vanadate, tellurure, thiocarbonate, polonure, or mixtures thereof. The preferred alkali metal salts of said precipitating agents are sodium oxalate, sodium phosphonate, sodium borate, sodium sesquicarbonate, sodium selenure, sodium vanadate, sodium tellurure, sodium thiocarbonate, sodium polonure, or mixtures thereof.

Particularly useful precipitating agents to be used herein further include silicate or carbonate salts, or mixtures thereof. The preferred alkali metal salts of silicate and carbonate are sodium silicate and sodium carbonate, both of which are commercially available, or mixtures thereof. Highly preferred to be used according to the process of the present invention is sodium carbonate, sodium silicate, sodium oxalate or mixtures thereof.

The compositions manufactured according to the process of the present invention comprise from 0.01% to 10% by weight of the total composition of each precipitating agent present, preferably from 0.01% to 7%, more preferably from 0.1% to 5% and most preferably from 0.2% to 3%.

As a further essential feature, the compositions manufactured according to the process of the present invention comprise an alkali metal hypochlorite or mixtures thereof. Various forms of alkali metal hypochlorite are commercially available and, although this is not critical for the present invention, it is preferred herein to use sodium hypochlorite. The compositions manufactured according to the present invention comprise a bleaching amount of alkali metal hypochlorite, which typically represents from 0.1% to 10% by weight of the total composition, based on active chlorine, of alkali metal hypochlorite. Preferred compositions herein comprise from 3% to 6% of alkali metal hypochlorite.

As another essential feature, the compositions manufactured according to the process of the present invention comprise a strong source of alkalinity or mixtures thereof. The compositions manufactured according to the present invention comprise from 0.04% to 2% by weight of the total composition of said strong source of alkalinity, or mixtures thereof, preferably of from 0.1% to 1.5% by weight and more preferably of from 0.2% to 0.9% by weight. Examples of strong sources of alkalinity are alkali metal hydroxides, such as potassium and/or sodium hydroxide, or alkali metal oxides such as sodium and/or potassium oxide.

Accordingly, the compositions manufactured according to the process of the present invention have a pH as is of from 10 to 14, preferably from 11 to 14 and more preferably 12 to 14. It is in the alkaline range that the optimum stability and performance of the hypochlorite is obtained.

The compositions manufactured according to the process of the present invention further comprise water in the necessary amount in order to complete said compositions. The water used in the process of the present invention is tap water, i.e. non-demineralized water.

The compositions manufactured according to the process of the present invention may further comprise optional ingredients including bleach-stable surfactants, organic or inorganic alkalis, perfumes, bleach-stable perfume solubilizer, dyes, optical brighteners, solvents, and the like. If present said optional ingredients are added in any step of the process of the present invention, i.e. before or after the separation step.

The compositions manufactured according to the process of the present invention are used in diluted form in laundry application. The expression "use in diluted form" herein includes dilution by the user, which occurs for instance in hand laundry applications, as well as dilution by other means, such as in a washing machine. Typical dilution levels are of from 0.5% to 20% for hand laundry application and 0.1% to 10% in a washing machine.

The present invention will be further illustrated by the following examples.

EXAMPLES

The following compositions are made according to the process of the present invention:

| Compositions | 1 | 2 | 3 |
|---|---|---|---|
| Sodium hypochlorite | 5.0 | 5.0 | 5.0 |
| Sodium hydroxide | 1.0 | 1.0 | 1.0 |
| Sodium carbonate | / | 1.3 | 1.3 |
| Dipicolinic acid | 2.0 | 1.0 | 1.0 |
| Sodium oxalate | / | 1.0 | / |
| pH | 13 | 13 | 13 |
| Water & minors | | 100% | |

The above compositions are manufactured at room temperature, i.e. at about 25° C.

In the first step of the process according to the present invention sodium hypochlorite, sodium hydroxide, tap water, and sodium carbonate if present as well as sodium oxalate if present are mixed together.

In the next step the resulting composition is filtered with a decantation filter.

And finally dipicolinic acid is added after the filtration step.

Compositions 1, 2 and 3 obtained according to the process of the present invention provide excellent whiteness and fabric safety to the fabrics treated therewith. These compositions further exhibit excellent stability. Indeed, after 10 days storage at 50° C., the content of active chlorine in compositions 1, 2 and 3 manufactured according to the process of the present invention is higher as compared to the content of active chlorine in similar compositions manufactured without adding any chelating agent capable of chelating heavy metal ions (e.g. dipicolinic acid) after the filtration step.

We claim:

1. A process for the manufacture of an aqueous liquid bleaching composition having a pH of from 10 to 14 and comprising an alkali metal hypochlorite, a strong source of alkalinity and water, said process including the steps of:
   1) mixing in a first step said alkali metal hypochlorite, said strong source of alkalinity and said water,
   2) separating in a second step the insoluble species formed in said first step, and
   3) thereafter adding a chelating agent capable of chelating heavy metal ions, wherein said chelating agent is a polycarboxylic acid of pyridine or salts thereof having one of the following formulas:

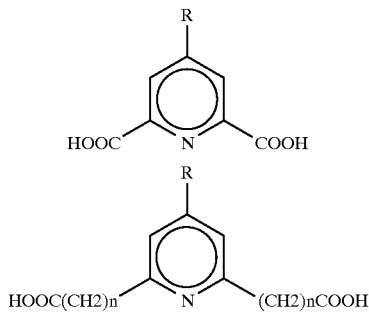

in which R is hydrogen, a halogen atom, a hydroxyl group, an amino group, a carboxylic group, or a short-chain alkyl group (C1–C4), and n is 1 or 2 or mixtures thereof.

2. A process according to claim 1 wherein said chelating agent has a binding constant K to heavy metal ions defined as follows, or mixtures thereof:
   when n=1, then $K>10^5$,
   when n=2, then $K>10^6$,
   when n=3, then $K>10^7$,
wherein n is the number of chelating agent molecules per heavy metal ion and wherein K is=$(MLn)/(M)(L)n$ and (MLn) is the concentration of heavy metal ion/chelating agent complexes, (M) is the concentration of free heavy metal ions, (L) is the concentration of free chelating agents.

3. A process according to claim 1 wherein said chelating agent has a binding constant K to heavy metal ions defined as follows, or mixtures thereof:
   when n=1, then $K>5.10^5$,
   when n=2, then $K>5.10^6$,
   when n=3, then $K>5.10^7$,
wherein n is the number of chelating agent molecules per heavy metal ion and wherein K is=$(MLn)/(M)(L)^n$ and (MLn) is the concentration of heavy metal ion/chelating agent complexes, (M) is the concentration of free heavy metal ions, (L) is the concentration of free chelating agents.

4. A process according to claim 1 wherein said chelating agent, or mixtures thereof, is added in amounts of from about 0.01% to about 5% by weight of the total composition.

5. A process according to claim 1 wherein said chelating agent, or mixtures thereof, is added in amounts of from about 0.01% to about 3% by weight of the total composition.

6. A process according to claim 1 wherein a precipitating agent which binds to heavy metal ions forming thereby salts having a solubility product in water not higher than about $10^{-6}$ at a temperature of about 25° C., is added to said composition before the separation step.

7. A process according to claim 1 wherein a precipitating agent is added to said composition before said separation step, said precipitating agent being selected from the group consisting of sodium oxalate, sodium phosphonate, sodium borate, sodium sesquicarbonate, sodium selenure, sodium vanadate, sodium tellurure, sodium thiocarbonate, sodium polonure, sodium carbonate, sodium silicate, and mixtures thereof.

8. A process according to claim 1 wherein a precipitating agent is added to said composition before said separation step, said precipitating agent being selected from the group consisting of alkali metal salts of oxalate, phosphonate, borate, sesquicarbonate, silicate, carbonate, selenure, vanadate, tellurure, thiocarbonate, polonure, and mixtures thereof.

9. A process according to claim 7 wherein each precipitating agent present is added in an amount of from about 0.01% to about 10% by weight of the total composition.

10. A process according to claim 7 wherein each precipitating agent present is added in an amount of from about 0.01% to about 7% by weight of the total composition.

11. A process according to claim 7 wherein said composition comprises from about 0.1% to about 10% by weight of the total composition, based on active chlorine, of hypochlorite.

12. A process according to claim 7 wherein said strong source of alkalinity is an alkali metal hydroxide, preferably sodium hydroxide, and wherein the pH is from about 11 to about 14.

13. A process according to claim 7 wherein the insoluble species formed are separated from said composition by filtering said composition with a decantation filter.

14. A process for the manufacture of an aqueous liquid bleaching composition having a pH of from about 10 to about 14 and comprising from about 0.01% to about 10% by weight of the total composition, based on active chlorine, of hypochlorite, a strong source of alkalinity and water, said process including the steps of:

mixing said hypochlorite, said strong source of alkalinity and said water, adding a precipitating agent selected from the group consisting of alkali metal salts of oxalate, phosphonate, borate, sesquicarbonate, silicate, carbonate, selenure, vanadate, tellurure, thiocarbonate, polonure, and mixtures thereof;

separating the insoluble species formed from said composition, and thereafter adding a chelating agent having a binding constant K to heavy metal ions defined as follows, or mixtures thereof:

when n=1, then $K>10^5$,
when n=2, then $K>10^6$,
when n=3, then $K>10^7$, wherein n is the number of chelating agent molecules per heavy metal ion and wherein K is=$(MLn)/(M)(L)^n$ and (MLn) is the concentration of heavy metal ion/chelating agent complexes, (M) is the concentration of free heavy metal ions, (L) is the concentration of free chelating agents.

15. A process according to claim 14 wherein the steps of said process each precipitating agent present is added in the amounts of from about 0.01% to about 10% by weight of the composition.

16. A process according to claim 15 wherein the steps of said process (L) is in the concentration of free chelating agents in amounts of from about 0.01% to about 5% by weight of the total composition.

* * * * *